United States Patent
Lefebvre et al.

(10) Patent No.: US 8,190,826 B2
(45) Date of Patent: May 29, 2012

(54) WRITE COMBINING CACHE WITH PIPELINED SYNCHRONIZATION

(75) Inventors: Laurent Lefebvre, Lachenaie (CA); Michael Mantor, Orlando, FL (US); Robert Hankinson, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 808 days.

(21) Appl. No.: 12/128,149

(22) Filed: May 28, 2008

(65) Prior Publication Data
US 2009/0300288 A1   Dec. 3, 2009

(51) Int. Cl.
G06F 12/00    (2006.01)
G06F 13/00    (2006.01)
G06F 13/28    (2006.01)

(52) U.S. Cl. ........... 711/140; 711/133
(58) Field of Classification Search ............ 711/133, 711/140
See application file for complete search history.

(56) References Cited

U.S. PATENT DOCUMENTS

| | | | | |
|---|---|---|---|---|
| 6,681,295 B1 * | 1/2004 | Root et al. | | 711/128 |
| 2004/0083341 A1 * | 4/2004 | Robinson et al. | | 711/133 |
| 2005/0055512 A1 * | 3/2005 | Kishi | | 711/135 |
| 2005/0097276 A1 * | 5/2005 | Lu et al. | | 711/118 |
| 2006/0059309 A1 * | 3/2006 | Harada | | 711/118 |
| 2006/0064548 A1 * | 3/2006 | Okamura | | 711/133 |
| 2008/0235457 A1 * | 9/2008 | Hasenplaugh et al. | | 711/130 |

OTHER PUBLICATIONS

Tanenbaum, Andrew, Structured Computer Organization, 1984, Prentice Hall.*

* cited by examiner

*Primary Examiner* — Jared Rutz
*Assistant Examiner* — Ryan Bertram
(74) *Attorney, Agent, or Firm* — Sterne, Kessler, Goldstein & Fox P.L.L.C.

(57) ABSTRACT

Systems and methods for pipelined synchronization in a write-combining cache are described herein. An embodiment to transmit data to a memory to enable pipelined synchronization of a cache includes obtaining a plurality of synchronization events for transactions with said memory, calculating one or more matches between said events and said data stored in one or more cache-lines of said cache, storing event time stamps of events associated with said matches, generating one or more priority values based on said event time stamps, concurrently transmitting said data to said memory based on said priority values.

15 Claims, 6 Drawing Sheets

WRITE COMBINING CACHE WITH PIPELINED SYNCHRONIZATION

BACKGROUND

1. Field of the Invention

The present invention relates to cache architectures, and more particularly to write combining caches.

2. Background Art

As the use of computer systems has increased, so has the desire for increased performance. Faster processors and computer systems are being developed to meet the needs of users throughout the world. One feature commonly found in processors to increase their performance is one or more cache memories. A cache memory is a memory unit that is smaller than the system memory (or the next higher level cache memory), but that operates at a faster speed than the system memory (or the next higher level cache memory). The goal of the cache memory is to contain the information (whether it be data or operations) that the execution unit(s) of the processor is going to use next. This information can then be returned to the execution unit(s) much more quickly, due to the higher speed of the cache memory.

When necessary, modified data from the cache is written back to the higher level system memory. In some cases, it may be necessary to have multiple memories in order to optimize transfer of data from cache to memory. As each of the writes is passed, for example, through a first cache memory to a second cache memory, a large amount of data is transferred between the two memories. One solution to this data traffic problem is to use a write combining cache to temporarily store write data from the first cache memory to the second cache memory or to system memory directly.

Conventionally, cache memories or write combining buffers operate in a manner that does not allow for concurrent update of data in the cache or write combining buffer, while data is being transmitted or "flushed" to the higher level memory. These conventional approaches may stall incoming data and prevent any new cache-lines from entering a cache while cache-lines are being flushed out to memory.

Therefore, conventional approaches synchronize cache memories or write combining buffers in a manner where a cache, or a write combining buffer, cannot be updated with data unless data previously present therein is flushed to a memory. This form of conventional synchronization may degrade any performance optimization that can be achieved by the use of one or more cache memories or write combining buffers.

What is needed, therefore, are improved methods and systems for synchronizing data in a write combining cache.

BRIEF SUMMARY OF THE INVENTION

Consistent with the principles of the present invention as embodied and broadly described herein, a write combining cache combines a plurality of memory transactions into one or more transactions so that data can be written to a memory in a manner that makes efficient use of bandwidth using synchronization events. For example, the write combining buffer collects write operations which belong to a same cache line address. Several smaller write operations are combined into a single, larger write operation.

The write combining cache includes a cache update module, an event module and a flush module and a plurality of cachelines that store data that can be written or "flushed" to a memory. The cache module, event module and the flush module operate in a manner that allows for cachelines in the write combining cache to be flushed to memory while data in one or more cache lines associated with the cache is updated by the cache update module. Thus, the data in cachelines of the write combining cache is transmitted to memory while write combining cache is receiving data from the cache update module. Furthermore, cachelines of the write combining cache are selectively flushed by the event module based on flush events generated by the flush module. This enables pipelined synchronization of the cache.

Current cache and write combining buffer technology does not allow concurrent large scale flushing of cache-lines of a cache. The present invention prevents stalling of data written to a cache by allowing concurrent update and flushing of cache-lines of a cache.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Various aspects of the present invention can be implemented by software, firmware, hardware (or hardware represented by software such as, for example, Verilog or hardware description language instructions), or a combination thereof.

Figure 1:
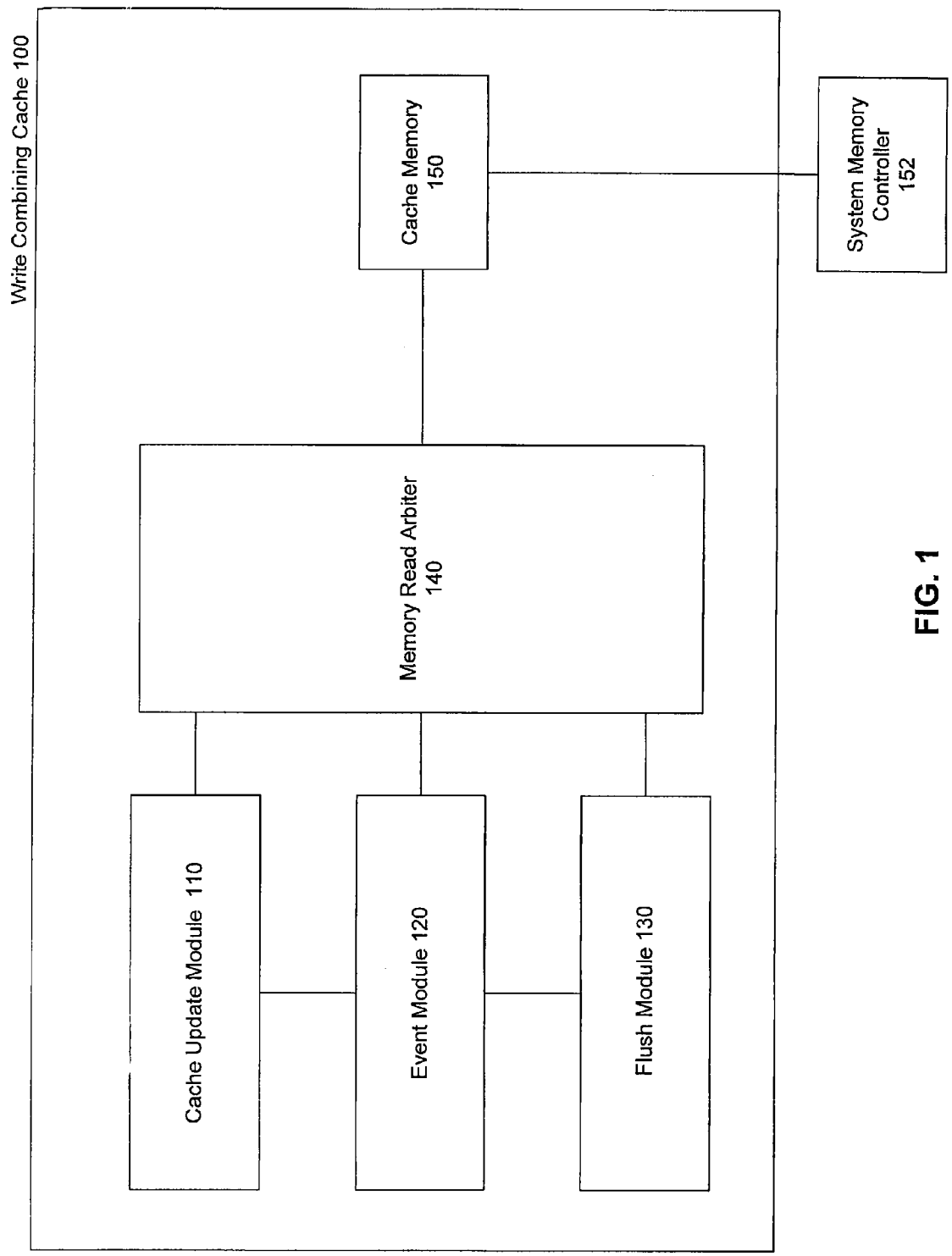
FIG. 1 is a exemplary block diagram of a write combining cache according to an embodiment of the invention.

FIG. 1 is an illustration of an example computer system in which the present invention, or portions thereof, can be implemented as computer-readable code. It should be noted that the simulation, synthesis and/or manufacture of the various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer usable medium including a semiconductor, magnetic disk, optical disk (such as CDROM, DVD-ROM) and as a computer data signal embodied in a computer usable (e.g., readable) transmission medium (such as a carrier wave or any other medium such as, for example, digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

The detailed description is divided into several sections as shown by the following table of contents:

---

Table of Contents

1. System
    1.1. Cache Update Module
        1.1.1. Match Engine
    1.2. Event Module
        1.2.1. Event Propagation
        1.2.2. No-Block Bit
    1.3. Flush Module and Eviction in Write Combining Cache
2. Selective Flushing and Flush Events
    2.1. Cache Flush Event
    2.2. Surface Sync Flush Event
    2.3. Shader Flush Events
    2.4. Acknowledge Flush Event
3. Conclusion

---

1. System

FIG. 1 is a block diagram illustration of a write combining cache 100 according to an embodiment of the invention. The write combining cache 100 includes cache update module 110, event module 120 and flush module 130. Additionally, write combining cache 100 includes memory arbiter 140 and cache memory 150.

1.1 Cache Update Module 110

Cache update module 110 monitors and updates cache lines of write combining cache 100.

Figure 2:
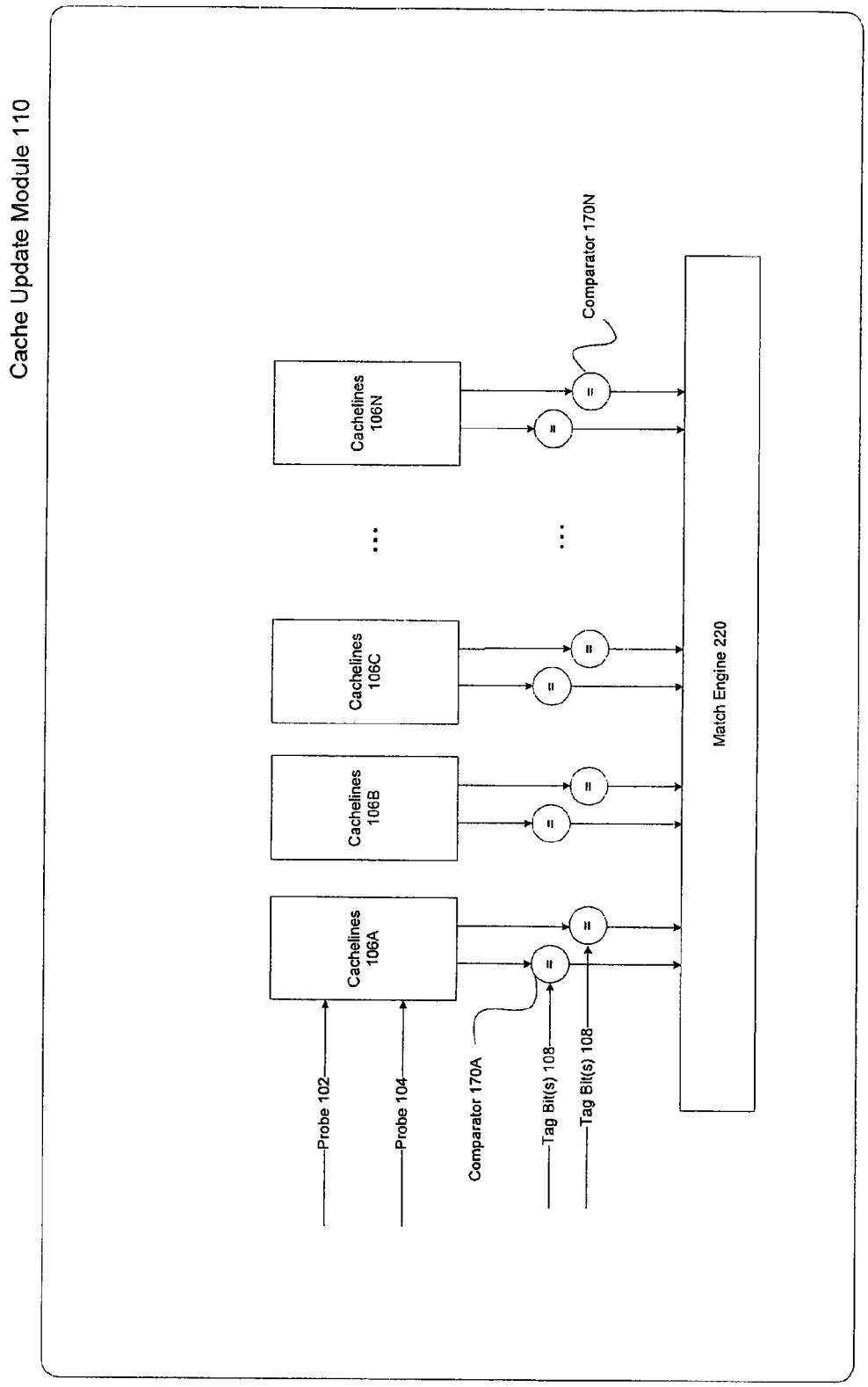
FIG. 2 is an exemplary block diagram of a cache update module in greater detail, according to an embodiment of the invention.

FIG. 2 is a more detailed illustration of cache update module 110, shown in FIG. 1. In the illustration of FIG. 2, cache update module 110 is associated with a plurality of cachelines 106A-N. Cache update module 110 receives probe 102 and probe 104. Additionally, tag bit(s) 108 are received by cache update module 110. The operation of tag bit(s) 108 is further described below, in relationship to comparators 170 and match engine 110.

In the exemplary illustration of FIG. 2, the cache update module 110 receives a "probe." Generally speaking, a probe is a message passed from a memory controller in a computer system to one or more caches in the computer system to determine if the caches have a copy of data. By way of example, a probe 102 or probe 104 are transmitted to write combining cache 100 in response to a command from a component (e.g. a processor), to read or write to cache memory 150. Since write combining cache 100 can only write to a specific portion of the cache memory 150, a 'probe' signal may direct data to the correct cache line in write combining cache 100. Once incoming data is received by cache update module 100, the incoming data is correctly processed in an appropriate manner and sent to memory arbiter 140. Memory arbiter 140 prioritizes writes to the cache memory 150 depending on how full the write combining cache 100 is, and whether collisions result from the writes. Memory arbiter 140 determines an order of priority of writes to the cache memory 150 between cache update module 110, event module 120, and flush module 130.

As soon as write combining cache 100 receives a probe transaction, the cache update module 110 determines whether there is a 'hit' or a 'miss' in cachelines 106A-N. If there is a cache hit, the new incoming data is allowed to combine with the data that is present in write combining cache 100. Empty cachelines are filled with the new incoming data. If there is a cache miss, cache update module 110 creates a new cacheline in the cache. Cache update module 110 determines, for every incoming probe, if the probe is a completely new probe using an address associated with the probe. Thus, if incoming data is new, cache update module 110 creates a new cacheline. However, if it is old, cache update module 110 combines it with an existing cacheline within the write combining cache 100.

Cache update module 110 can selectively update cachelines with data based on one or more write requests. In the exemplary illustration if FIG. 2, cache update module 110 updates a 16-way set associative write combining cache. As an example, write requests received by cache update module 110 for the sixteen-way set associative cache can receive one probe per set for each of the sets of a set associative cache and one set empty bit per probe. Additionally, per cache-line, cache update module 110 receives sixteen valid bits, one global valid bit, seven bits corresponding to an event time stamp (ETS) of the received events, four type bits, twenty-six bits of address or tag bit(s) 108, and one flush bit.

1.1.1. Match Engine 220

A probe received by write combining cache 100 includes data that is to be written to cache memory 150. As an example, probe 102 or probe 104 can be received by the write combining cache 100. The match engine 220 uses tag bits 108 to determine if a cache-hit or a cache-miss occurred. Cache-hits and cache-misses are computed by match engine 220 using one or more comparators 170A-N. Tag bits 108 are compared against cachelines 106A-N in write combining cache 100. In an embodiment, write combining cache 100 is a sixteen-way set associative cache. Selected bits of an address, associated with a probe, determine which bank of the cache memory 150 a cache line is to be flushed to. Thus only sixteen bits of tag bits 108 need to be compared by match engine 220.

In the embodiments described above, for each of the cachelines, a first section of the address that is associated with every incoming probe determines which cache-line is selected. For example, an incoming address associated with probe 102 determines whether cacheline 106A is selected. Furthermore, only one cacheline from each of the 'N' banks is transmitted to the comparators 170A-N. The remainder of the address, in tag bit(s) 108 of an incoming probe, is compared by match engine 220 against a tag of cachelines 106A-N to determine if there is a match.

In this way, match engine 220 receives outputs of the comparators 170A-N and determines, based on the outputs, if one or more matches have occurred. If no matches have occurred, a new cacheline is allocated for the incoming probe data.

If a new cacheline needs to be created and cache memory 150 is full, the cache update module 110 may selectively choose a cacheline for eviction to system memory to allow for room to be created in the cache memory 150 for any incoming data probe.

1.2. Event Module 120

In the embodiments described above, all synchronization in write combining cache 100 is carried out by event module 120. Event module 120 uses a plurality of event time stamps (ETS) to execute this synchronization.

Figure 3:
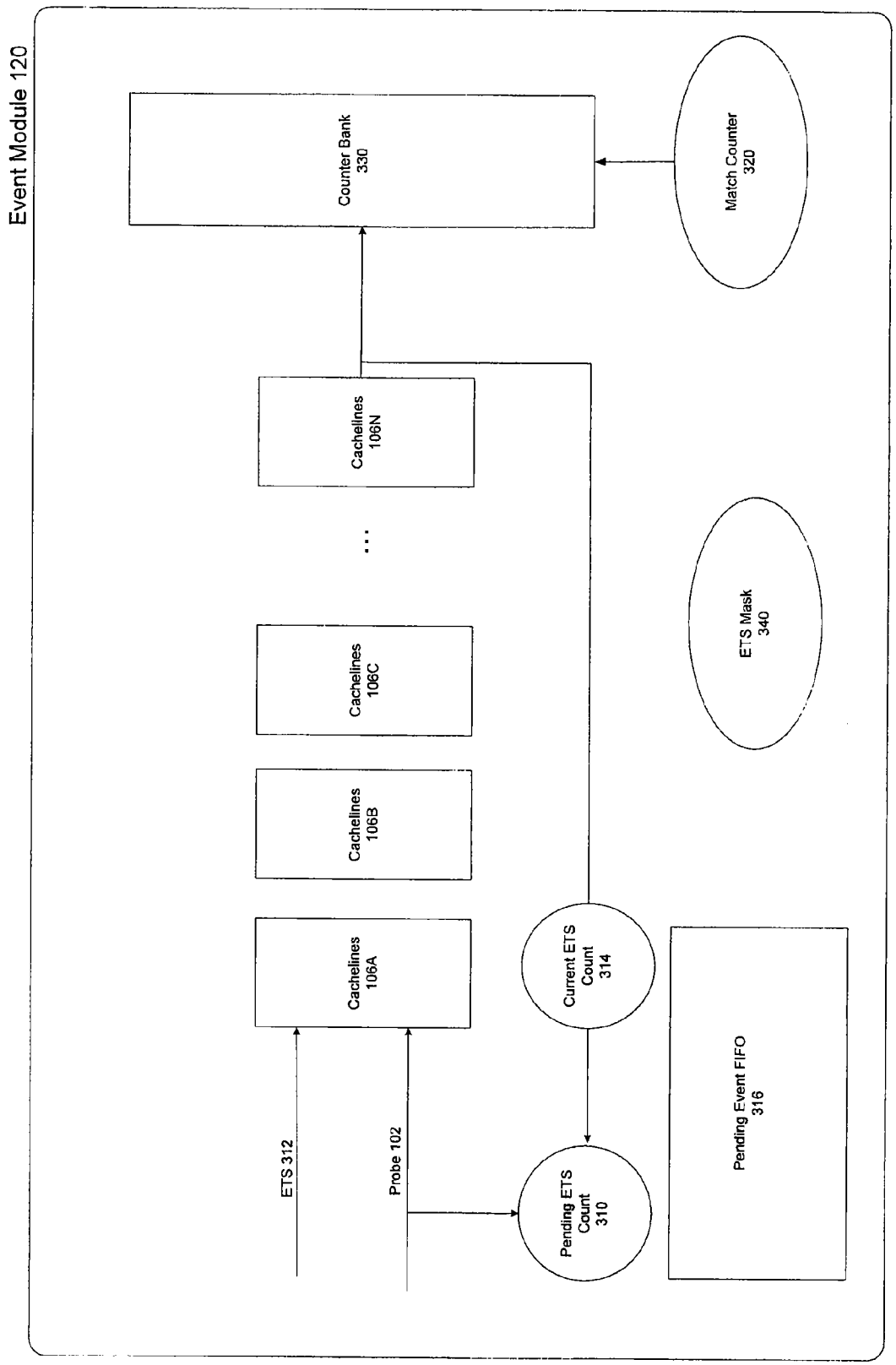
FIG. 3 is an exemplary block diagram of an event module in greater detail, according to an embodiment of the invention.

FIG. 3 is a more detailed illustration of event module 120, shown in FIG. 1. Event module 120 is associated with a plurality of cachelines 106A-N, and is configured to receive ETS 312 and probe 102. Additionally, event module 120 can include pending ETS count 310, current ETS count 314, counter bank 330, match counter 320, and pending event FIFO 316.

When an event is received that marks one or more cachelines for eviction, or for flushing to cache memory 150, it may be necessary for event module 120 to know, for synchronization purposes, when cachelines 106A-N where flushed by flush module 130. It may also be necessary for even module 120 to know when data is written to cache memory 150.

ETS 312 can be used to track which cacheline needs to be evicted next. When an event is received, it is associated with an ETS value, for example, ETS 312. After an event is received, event module 120 then checks cachelines 106A-N in write combining cache 100 and sets appropriate mask bits in ETS mask 340. When a mask bit is set by event module 120, a cacheline associated with the mask bit is marked for eviction and is flushed out by flush module 130.

Thus, event module 120 compares the received data with the state of each cacheline. If a match occurs, a mask bit is set in ETS mask 340. The event module 120 then checks all ETS values in the order in which they are received in order to maintain an order of events. Furthermore, event module 120 calculates one or more priority values for each event based on the ETS values. As an example, ETS 312 can be a seven bit field, thus yielding 128 different ETS values.

1.2.1. Event Propagation

Once an event reaches write combing cache 100, all cache lines are compared to see if the event matches a request to write data to cache memory 150. Cachelines that match are marked as "flush" and receive the ETS of the current event, for example ETS 312. The number of matches is stored in match counter 320, and are recorded in counter bank 330. They are recorded at a position that can be determined by ETS 312. By way of example, counter bank 330 can be a bank of 128 counters.

If no matches result and there are events in write combining cache 100, an event is pushed with no-block bit set onto pending event FIFO 316. Thus, an event may go through as it is no longer blocked in write combining cache 100. When a no block bit is set, a shader or any other requesting entity need not wait for any acknowledgement from write combining cache 100 before a new event can be sent out to write combining cache 100. If matches occur, the event module 120 finds and identifies the last evicted cacheline in the write combining cache 100, marks it as acknowledged, and pushes an event with no-block bit cleared onto pending event FIFO 316. Pending event FIFO 316 can be any form of queue or data structure that processes events in a "first in, first out" manner. If write combining cache 100 is fully empty, an event is pushed with a no-block bit set. On each event request, pending ETS count 310 is incremented by event module 120.

Figure 4:
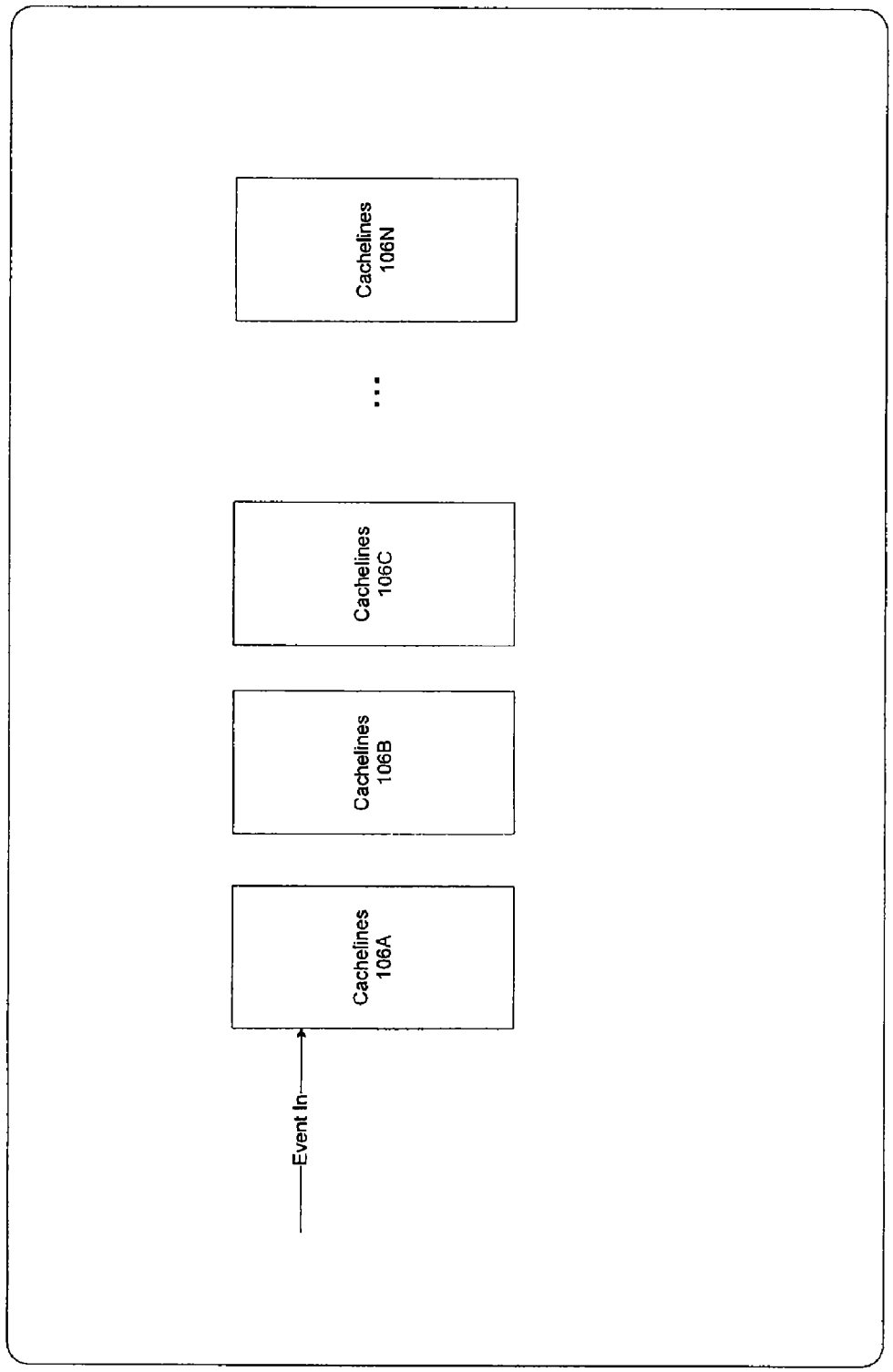
FIG. 4 is an exemplary block diagram of a flush module in greater detail, according to an embodiment of the invention.

FIG. 4 is a more detailed illustration of the flush module 130, shown in FIG. 1.

Figure 5:
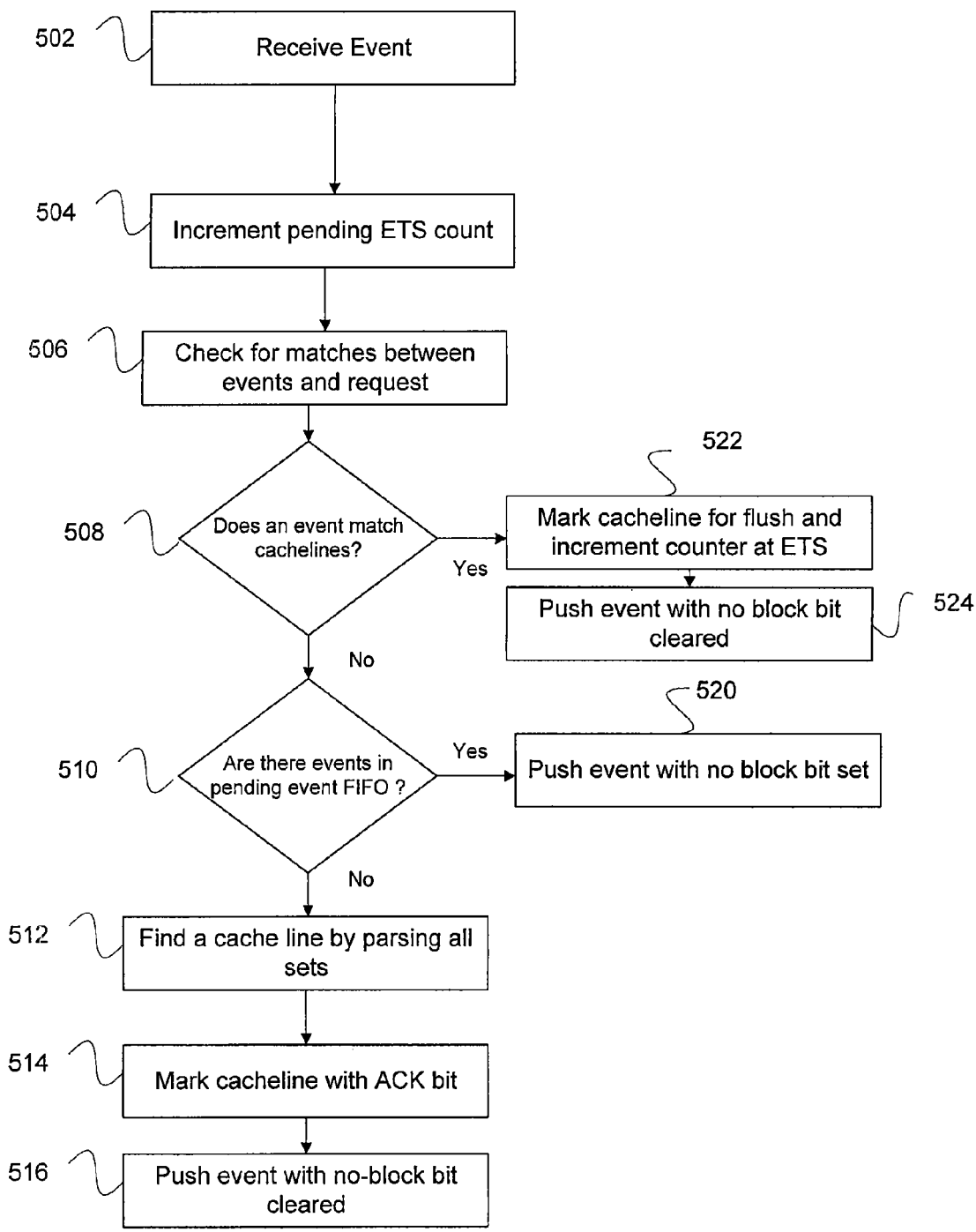
FIG. 5 is an flowchart illustrating an exemplary operation of an event module, according to an embodiment of the invention.

FIG. 5 is a flowchart of an exemplary method 500 of practicing an embodiment of the present invention. Method 500 can be used to push one or more events onto pending event FIFO 316. Method 500 begins at step 502 with an event module receiving an event (step 502). The event module then increments a pending ETS count 310 (step 504). As an example, event module 120 increments pending ETS count 310.

The event module then checks for matches between events and cachelines (step 506). For every cacheline that matches an event request (step 508), it is marked for flush and the counter pointed by the ETS of the event is incremented (step 522). Then the event is pushed to a event FIFO with the no block bit cleared (step 524) If an event does not match cachelines (step 508), the event module checks if there are any events pending the event FIFO (step 510). As an example, event module 120 checks to determine whether there are events in pending event FIFO 316.

If there are events pending (step 510), an event is pushed with a no-block bit set (step 520). If there are no events in the pending event FIFO, the event module finds an empty cacheline by parsing all sets in case of a set associative cache (step 512).

The event module then marks the found cacheline with an acknowledge (ACK) bit and pushes the event with the no-block bit cleared (step 516).

A state machine in event module 120 walks through the plurality of ETS values checking them one at a time starting at a value of zero. It then checks a counter at the ETS value and then evicts cachelines corresponding to the flush bit that has been set. On the last cacheline evicted, the state machine marks it with an ACK bit. Once it has completed evicting all cachelines marked as flush, the state machine decrements the current ETS count 312 and select the next ETS value. Next, it decrements the pending ETS count 310, and event module 120 waits for the ACK bit to return from system memory controller 152 before it sends a synchronization token back to a shader or any other entity that requested data. The synchronization token, for example, includes data that confirms that all marked lines were evicted or flushed to cache memory 150 by flush module 130.

Figure 6:
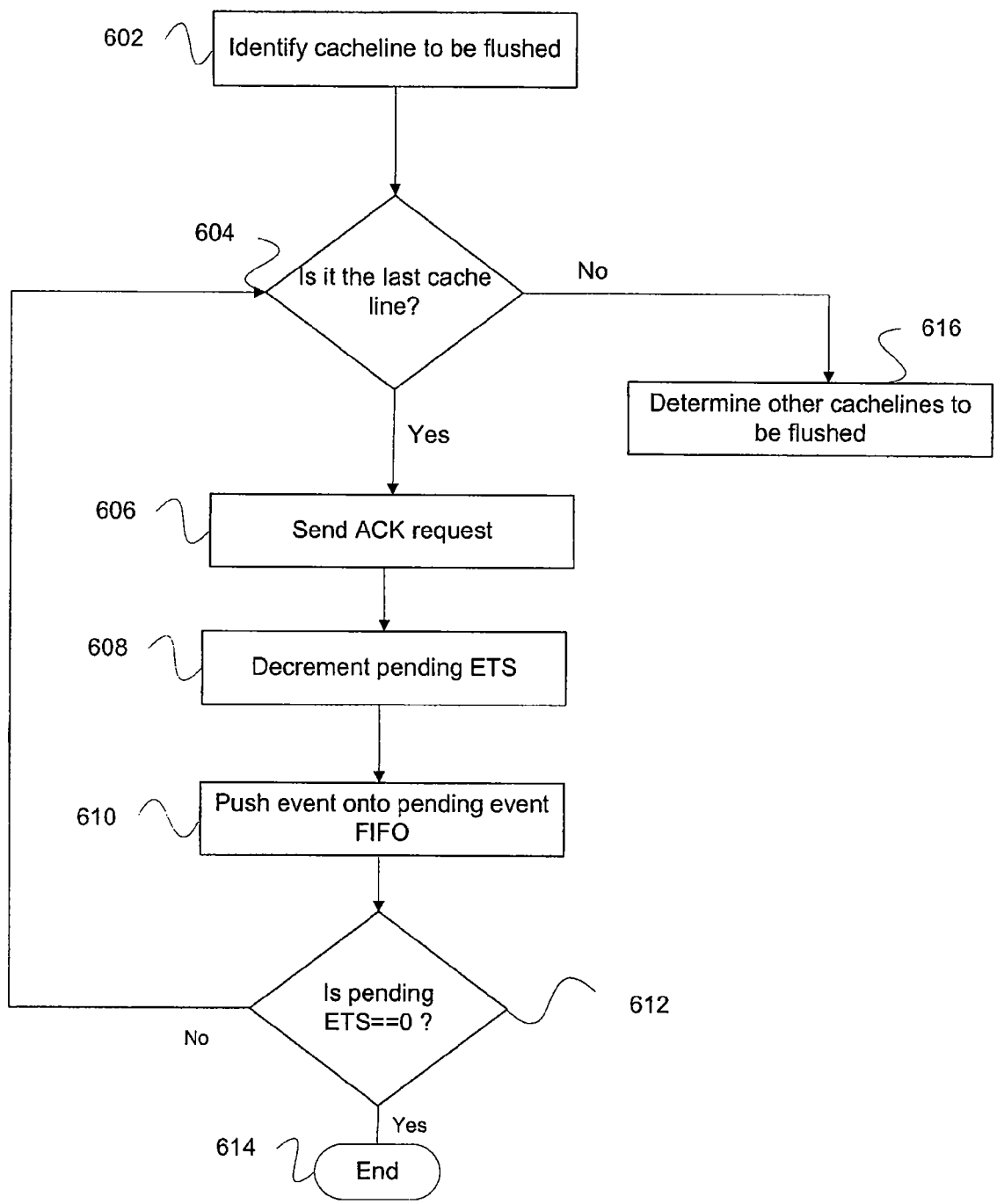
FIG. 6 is a flowchart illustrating flushing of cachelines, according to an embodiment of the invention.

FIG. 6 is a flow chart of an exemplary method 600 of practicing the present invention. The method 600 is used by event module 120 to control event propagation.

Method 600 begins at step 602 with a state machine identifying a cacheline that requires flushing (step 602). As an example, a state machine in event module 120 identifies a particular cacheline that needs to be flushed. The event module will then determine whether it is the last cacheline that needs to be flushed (step 604). If it is not the last cacheline that needs to be flushed (step 604), the event module determines other cachelines that need to be flushed (step 616).

On the other hand, if it is the last cacheline that needs to be flushed (step 604), the event module will send an acknowledge (ACK) request to system memory controller 152, for example, a shader (step 606). The event module subsequently decrements a pending ETS count (step 608). As an example, event module 120 will decrement pending ETS count 310.

The event module will then push an event onto a pending event FIFO (step 610), such as the FIFO 316. Next, the event module checks whether a pending ETS equals zero (step 612). For example, event module 120 check whether pending ETS count 310 equals zero. If so (step 612), method 600 ends (step 614). If a pending ETS count does not equal zero, method 600 proceeds to step 604.

In this manner, event module 120 synchronizes events in write combining buffer 100 by using event time stamps (ETS). Additionally, at all times data is still accepted to the cache and while the cacheline status is updated by event module 120.

1.2.2. No-Block Bit

A no-block bit is set when an event by write combining cache 100 from a shader or any other entity but there is no data in write combining cache 100 that can be flushed to cache memory 150. In an embodiment, a no-block bit is then set by event module 120 when write combining cache 100 is empty and the event is then returned to the shader with the no-block bit set. Thus, for example, when the shader receives the no-block bit, it knows that write combining cache 100 has no data that can be flushed to cache memory 150. This assists in pipelined synchronization of write combining cache 100.

When an event is received, flush module 130 selectively flushes other cachelines, in addition to the ones pertaining to a particular event. By way of example, if more than one shader requests data to be written to cache memory 150, event module 120 sends sync tokens to each shader. If several sync events are generated, event module 120 checks if all events preceding a certain event have been serviced. Furthermore, any incoming request from a shader will be checked to see whether the data requested by the event has been flushed by the shader. Thus, when event module 120 is operating and synchronizing events, input events received from a shader, for example, are never stalled. At all times data is accepted by write combining cache 100 while status of cachelines 106A-N is updated by event module 120.

1.3. Flush Module 130 and Eviction in Write Combining Cache 100

In the exemplary embodiment above, write combining cache 100 only evicts data in cachelines 106A-N if incoming tag bits 108 do not match with any of the cacheline tag bits. The write combining cache 100 also evicts if a cacheline is fall. Write combining cache 100 then selects one of cache lines 106A-N and evicts them. Although in the present embodiment a strict round robin policy is used for eviction, other well known eviction techniques can be used. For example, fully random eviction techniques are available, and are known to those skilled in the art.

2. Selective Flushing and Flush Events

In the present embodiment, data is only read from write combining cache 100 after it has been flushed to cache memory 150. Thus in order to read the cache-lines, data in the cache lines 106A-N needs to be flushed to memory. Furthermore, cachelines 106A-N need to be selectively flushed in a manner that prevents stalling of the input probes. Also, for effective use of bandwidth, only relevant data in cachelines 106A-N needs to be flushed. Event module 120 selectively identifies cachelines require flushing. Flush module 130 checks if there are any full cachelines in write combining cache 100. If there is a full cache-line, flush module 130 flushes the cache-line to cache memory 150.

Cachelines 106A-N are flushed if there is an update to a cacheline from an incoming probe and there is no cacheline available to store data associated with the update. Additionally a cacheline can be flushed by flush module 130 if it is full and can be flushed to memory for an efficient memory transaction. However, all cache-lines need not be flushed, and cache-lines that include requested data are selectively flushed.

A number of different flush events exist.

2.1. Cache Flush Event

A cache flush event is a generic type of a flush event to flush all cache-lines to memory. When event module 120 receives a cache flush event, all cache lines in write combining cache 100 will be marked for eviction and flushed to cache memory 150 by flush module 130. As an example, a cache flush event can be generated by flush module 130 at the end of a frame of data to flush all cache-lines to cache memory 150.

2.2. Surface Sync Flush Event

A surface sync flush event is used to selectively flush cachelines 106A-N that have a "sync" bit set. A sync bit is part of synchronization data that is stored by each cacheline 106A-N in write combining cache 100. When a request for a write operation is received by write combining cache 100, it sets the sync bit of certain cache-lines. When a surface sync event is received by event module 120, event module 120 flushes cache-lines that have their sync bits set. In this way, selected cache-lines are flushed to cache memory 150.

2.3. Shader Flush Events

In an exemplary scenario, not intended to limit the invention, in addition to a sync bit, each cache-line may have two additional bits set by different types of shaders. Shaders, for example, include a set of instructions used by a graphics processing unit to perform rendering effects. As an example, write combining cache 100 can receive data from different types of shaders, such as a vertex shader, a pixel shader, or a geometry shader. In any case, data that needs to be processed by a shader needs to be flushed out to cache memory 150 from cachelines 106A-N prior to use by another shader. When data being processed by a vertex shader needs to be processed by a geometry shader, the geometry shader waits to begin processing the same data until it is available in cache memory 150.

Shader flush events are issued by a shader indicating that it has completed processing data and the data can now be flushed to cache memory 150. Thus, the data is flushed to cache memory 150 by flush module 130 before the event is returned.

In this way, all cachelines 106A-N have a two-bit field corresponding to a shader type and when a write request is received for a particular shader type. If the bit filed in a cache-line corresponding to a shader type is set, that cache-line is marked for eviction and will be flushed by flush module 130.

2.4. Acknowledge (ACK) Flush Event

ACK flush events are used when temporary arrays need to be used in association with write combining cache 100. As an example, if a shader is using too many general purpose registers (GPRs), data might need to be written or "spill" into system memory 151. When data is to be written to system memory 151, it's first sent to cache memory 150 through write combining cache 100. However, when data is "spilled" to memory, an ACK bit is set on all transfers and is stored on a per cacheline basis by flush module 130. This way the shader can know when the data arrived in system memory 151 and thus that it is safe to read it. An ACK bit, for example, can be state information that is stored per cacheline.

When a request for data from a GPR occurs, event module 120 sends an ACK event. As a result, flush module 130 then flushes all cachelines that have their ACK bit set. After cachelines having their ACK bit set have been flushed by flush module 130, a synchronization token is sent back to the shader, or any other entity that requested the data. Once the token is received, the shader reads data from a system memory.

In this way, synchronization is achieved using an ACK bit and a synchronization token.

3. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for transmitting data to a memory to enable pipelined synchronization of a cache, comprising:
    storing data from a plurality of write operations in one or more cachelines of said cache;
    combining said write operations of an identical cacheline address into a combined write operation;
    flushing said data in said one of more cachelines to said memory based on said combined write operation, said flushing including pushing one or more synchronization events to said memory with a no-block bit set when there are no events in a pending cache FIFO; and
    concurrently updating said one or more cachelines with additional data during said flushing.

2. The method of claim 1, further comprising:
    obtaining said one or more synchronization events for transactions with said memory;
    determining one or more matches between said synchronization events and said data stored in said cachelines of said cache;
    storing event time stamps of said synchronization events associated with said matches;
    generating one or more priority values based on said event time stamps; and
    transmitting said data to said memory based on said priority values.

3. The method of claim 2, wherein said determining comprises:
    analyzing outputs of a plurality of comparators.

4. The method of claim 1, further comprising:
    comparing an address associated with an incoming synchronization event with a plurality of tag-bits.

5. The method of claim 2, wherein said transmitting further comprises:
    identifying a plurality of said one or more cachelines for said flushing to said memory.

6. A computer program product including a non-transitory commuter-readable medium having instructions stored thereon, execution of which by a processing device cause said processing device to perform operations comprising:
    storing data from a plurality of write operations in one or more cachelines of said cache;
    combining said write operations of an identical cacheline address into a combined write operation;
    flushing said data in said one of more cachelines to said memory based on said combined write operation, said flushing including pushing one or more synchronization events to said memory with a no-block bit set when there are no events in a pending cache FIFO; and
    concurrently updating said one or more cachelines with additional data during said flushing.

7. The computer program product of claim 6, the operations further comprising:
    obtaining said one or more synchronization events for transactions with said memory;
    determining one or more matches between said synchronization events and said data stored in said cachelines of said cache;
    storing event time stamps of said synchronization events associated with said matches;
    generating one or more priority values based on said event time stamps; and
    transmitting said data to said memory based on said priority values.

8. The computer program product of claim 7, the operations further comprising:
    analyzing outputs of a plurality of comparators.

9. The computer readable medium of claim 6, the operations further comprising:
    compare an address associated with an incoming synchronization event with a plurality of tag-bits.

10. The computer program product of claim 7, the transmitting further comprising:
    identifying a plurality of said one or more cachelines for said flushing to said memory.

11. A system for transmitting data to a memory to enable pipelined synchronization of a cache, comprising:
    a hardware-based first module configured to store data from a plurality of write operations in one or more cachelines of said cache;
    a hardware-based second module configured to combine said write operations of an identical cacheline address into a combined write operation;
    a hardware-based third module configured to flush said data in said one of more cachelines to said memory based on said combined write operation, said flush including pushing one or more synchronization events to said memory with a no-block bit set when there are no events in a pending cache FIFO; and
    a hardware-based fourth module configured to concurrently update said one or more cachelines with additional data during said flushing.

12. The system of claim 11, further comprising:
    a fifth module configured to obtain said one or more of synchronization events for transactions with said memory;
    a sixth module configured to determine one or more matches between said synchronization events and said data stored in said cachelines of said cache;

a seventh module configured to store event time stamps of said synchronization events associated with said matches;
an eighth module configured to generate one or more priority values based on said event time stamps; and
a ninth module configured transmit said data to said memory based on said priority values.

13. The system of claim 12, further comprising:
a tenth module configured to analyze outputs of a plurality of comparators.

14. The system of claim 11, further comprising:
a fifth module configured to compare an address associated with an incoming synchronization event with a plurality of tag-bits.

15. The system of claim 12, further comprising:
a tenth module configured to identify a plurality of said one or more cachelines for flushing to said memory.

* * * * *

UNITED STATES PATENT AND TRADEMARK OFFICE
CERTIFICATE OF CORRECTION

PATENT NO. : 8,190,826 B2  
APPLICATION NO. : 12/128149  
DATED : May 29, 2012  
INVENTOR(S) : Lefebvre et al.

Page 1 of 1

It is certified that error appears in the above-identified patent and that said Letters Patent is hereby corrected as shown below:

Column 9
Line 39, Claim 1, please replace "one of more cachelines" with --one or more cachelines--.

Column 10
Line 36, Claim 9, please replace "compare an address" with --comparing an address--.

Column 10
Line 52, Claim 11, please replace "one of more cachelines" with --one or more cachelines--.

Signed and Sealed this
Fourteenth Day of August, 2012

David J. Kappos
*Director of the United States Patent and Trademark Office*